(12) United States Patent
Lu et al.

(10) Patent No.: US 10,301,418 B2
(45) Date of Patent: May 28, 2019

(54) CHEMICAL RESISTANT POLYURETHANE ADHESIVE

(71) Applicant: 3M INNOVATIVE PROPERTIES COMPANY, St. Paul, MN (US)

(72) Inventors: Yongshang Lu, Woodbury, MN (US); Zhong Chen, Woodbury, MN (US); Jingjing Ma, Cottage Grove, MN (US); Charlie C. Ho, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 7 days.

(21) Appl. No.: 15/545,026

(22) PCT Filed: Jan. 14, 2016

(86) PCT No.: PCT/US2016/013368
§ 371 (c)(1),
(2) Date: Jul. 20, 2017

(87) PCT Pub. No.: WO2016/118399
PCT Pub. Date: Jul. 28, 2016

(65) Prior Publication Data
US 2018/0010024 A1  Jan. 11, 2018

Related U.S. Application Data

(60) Provisional application No. 62/221,186, filed on Sep. 21, 2015, provisional application No. 62/126,900, filed on Mar. 2, 2015, provisional application No. 62/105,980, filed on Jan. 21, 2015.

(51) Int. Cl.
| | | |
|---|---|---|
| *C08G 18/34* | (2006.01) | |
| *C08G 18/65* | (2006.01) | |
| *C09J 175/06* | (2006.01) | |
| *C08G 18/66* | (2006.01) | |
| *C08G 18/72* | (2006.01) | |
| *C08G 18/73* | (2006.01) | |
| *C08G 18/75* | (2006.01) | |
| *C08G 18/76* | (2006.01) | |
| *C08G 18/10* | (2006.01) | |
| *C08G 18/42* | (2006.01) | |
| *C09J 11/00* | (2006.01) | |
| *C09J 7/38* | (2018.01) | |

(52) U.S. Cl.
CPC ......... *C08G 18/348* (2013.01); *C08G 18/10* (2013.01); *C08G 18/42* (2013.01); *C08G 18/4211* (2013.01); *C08G 18/4277* (2013.01); *C08G 18/65* (2013.01); *C08G 18/6625* (2013.01); *C08G 18/724* (2013.01); *C08G 18/73* (2013.01); *C08G 18/755* (2013.01); *C08G 18/7642* (2013.01); *C08G 18/7671* (2013.01); *C09J 7/38* (2018.01); *C09J 11/00* (2013.01); *C09J 175/06* (2013.01); *C08G 2170/40* (2013.01); *C09J 2201/606* (2013.01); *C09J 2201/622* (2013.01); *C09J 2475/00* (2013.01)

(58) Field of Classification Search
CPC ..... C08G 18/4211; C08J 175/06; C08L 75/06
See application file for complete search history.

(56) References Cited

U.S. PATENT DOCUMENTS

| | | |
|---|---|---|
| 3,437,622 A | 4/1969 | Dahl |
| 3,681,277 A | 8/1972 | Scholz |
| 3,718,712 A | 2/1973 | Tushaus |
| 4,087,392 A | 5/1978 | Hartmann |
| 5,591,820 A | 1/1997 | Kydonieus |
| 5,608,000 A | 3/1997 | Duan |
| 5,708,073 A | 1/1998 | Dodge |
| 6,866,235 B2 | 3/2005 | Zimmermann |
| 7,160,976 B2 | 1/2007 | Luhmann |
| 7,326,374 B2 | 2/2008 | Hatanaka |
| 8,247,514 B2 | 8/2012 | Griswold |
| 2003/0225240 A1 | 12/2003 | Quint |
| 2004/0068049 A1 | 4/2004 | Wintermantel |
| 2006/0074214 A1 | 4/2006 | Kesselmayer |
| 2006/0089452 A1 | 4/2006 | Schneider |
| 2007/0031680 A1 | 2/2007 | Fromwiller |
| 2009/0240005 A1 | 9/2009 | Kraus |
| 2011/0111221 A1 | 5/2011 | Schumann |
| 2013/0143010 A1 | 6/2013 | Buchner |
| 2013/0309504 A1* | 11/2013 | Nakamura ......... C08G 18/4211 428/421 |
| 2014/0018458 A1* | 1/2014 | Hillshafer ............ C08G 63/181 521/172 |
| 2014/0039123 A1 | 2/2014 | Iseki |
| 2014/0065415 A1 | 3/2014 | Sasaki |
| 2014/0127504 A1 | 5/2014 | Sasaki |
| 2017/0247587 A1 | 8/2017 | Ma |
| 2018/0237671 A1* | 8/2018 | Das ........................ C09J 175/06 |

FOREIGN PATENT DOCUMENTS

| | | |
|---|---|---|
| CN | 102703015 | 10/2012 |
| JP | 2000256639 | 9/2000 |
| WO | WO 2002-04536 | 1/2002 |
| WO | WO 2009-129292 | 10/2009 |
| WO | WO 2014/188865 | 11/2014 |
| WO | WO 2015-188067 | 12/2015 |

OTHER PUBLICATIONS

Burke, "Solubility Parameters Theory and Application", (2011) [online] [retrieved on Mar. 7, 2016] Retrieved from the Internet <URL http//cool conservation-us.org/coolaic/sg/bpg/annual/v03/bp03-04 html>, pp. 1-20.

Dispercoll® U 42, Product Datasheet, 2013, 3 pages.

Hoy, "Solubility Parameter as a Design parameter for water borne polymers and coatings", J. Coated Fabrics, 1989, vol. 19, No. 53, pp. 53-67.

(Continued)

*Primary Examiner* — Marc S Zimmer
(74) *Attorney, Agent, or Firm* — Adam Bramwell; Carolyn A. Fischer

(57) ABSTRACT

A pressure sensitive adhesive composition includes a polyurethane polymer that includes the reaction product of a polyisocyanate component and a polyol component. The polyol component has a total solubility parameter ranging from 10 to 14 $(cal/cm^3)^{1/2}$.

24 Claims, No Drawings

(56) References Cited

OTHER PUBLICATIONS

Stepanpol® PH-56, Product Bulletin, 2012, 2 pages.
Stepanpol® PH-56, Stepan Company, [online] [retrieved on Jan. 13, 2015] Retrieved from the Internet <URL http://www.stepan.com/Products/Polymers/STEPANPOL%C2%AE/STEPNPOL%C2%>, 2 pages.
International Search report for PCT International Application No. PCT/US2016/13368 dated Mar. 28, 2016, 3 pages.
Extended EP Search Report, EP 16740523.2, dated Aug. 14, 2018, 6 pages.

* cited by examiner

CHEMICAL RESISTANT POLYURETHANE ADHESIVE

CROSS REFERENCE TO RELATED APPLICATIONS

This application is a national stage filing under 35 U.S.C. 371 of PCT/US2016/013368, filed Jan. 14, 2016, which claims the benefit of U.S. Provisional Application No. 62/221,186, filed Sep. 21, 2015, U.S. Provisional Application No. 62/126,900, filed Mar. 2, 2015, and U.S. Provisional Application No. 62/105,980, filed Jan. 21, 2015, the disclosures of which are incorporated by reference in their entirety herein.

SUMMARY OF THE INVENTION

In one embodiment a pressure sensitive adhesive composition is described comprising a polyurethane polymer that comprises the reaction product of a polyisocyanate component and a polyol component; wherein the polyol component has a total solubility parameter ranging from 10 to 14 $(cal/cm^3)^{1/2}$. The polyol component typically has hydrogen bonding solubility parameter ranging from 3.5 to 6. The polyol component typically comprises a polyester polyol, a polycaprolactone polyol, a polycarbonate polyol, or a combination thereof. The polyol component, isocyanate component, or combination thereof comprises at least one six-membered (e.g. aromatic) ring structure. The polyol component, isocyanate component, or combination thereof further comprises alkylene groups having at least 4, 5, or 6 carbon atoms.

In one embodiment, the polyurethane polymer comprises the reaction product of a polyisocyanate component and a polyol component that comprises polymerized units of an ortho- or meta-phthalate and an alkylene group comprising at least 4 carbon atoms.

In one embodiment, the polyol component comprises a polymeric polyester polyol having the structure

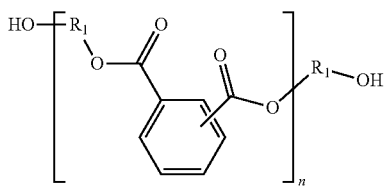

wherein $R_1$ is independently an alkylene group comprising at least 4 carbon atoms, n is at least 2, and the ester group substituents are bonded to the ring at an ortho- or meta-position.

Also described are articles such as laminating tapes and protective films as well as methods of bonding substrates with the pressure sensitive adhesive and laminating tape.

DETAILED DESCRIPTION

The polyurethane composition comprises the reaction product of a polyisocyanate component and a polyol component.

The polyol component comprises an aromatic and/or aliphatic (e.g. polyester, polycaprolactone, polycarbonate) polyol that comprises at least two hydroxyl terminal groups. When the (e.g. polyester) polyol averages 2 hydroxyl groups, it may be characterized as an (e.g. aromatic polyester) diol. In other embodiments, the (e.g. aromatic polyester) polyol may be characterized as an (e.g. aromatic polyester) triol. In yet other embodiments, the (e.g. aromatic polyester) polyol may comprise a mixture of diol and triol, wherein the number of hydroxyl groups averages greater than 2, yet less than 3. Other polyols have 4, 5 or 6 hydroxyl terminal groups. Polyester polyols can be obtained by, for example, an esterification reaction between a polyol component and an acid component. Examples of acid components include succinic acid, methylsuccinic acid, adipic acid, pimelic acid, azelaic acid, sebacic acid, 1,12-dodecanedioic acid, 1,14-tetradecanedioic acid, dimer acid, 2-methyl-1,4-cyclohexanedicarboxylic acid, 2-ethyl-1,4-cyclohexanedicarboxylic acid, terephthalic acid, isophthalic acid, phthalic acid, 1,4-naphthalenedicarboxylic acid, 4,4'-biphenyldicarboxylic acid, and acid anhydrides thereof.

An aromatic polyester polyol can be produced by polymerizing an aromatic dicarboxylic acid with an aliphatic diol, as known in the art. In one embodiments, the aromatic dicarboxylic acid typically comprises a major amount of isophthalic acid or phthalic acid. The polyester polyol may optionally be produced from a minor amount of other aromatic dicarboxylic acid such as terephthalic acid. Further, the polyester polyol may optionally be produced from a minor amount of cycloaliphatic dicarboxylic acids such as 1,3-cyclopentanedicarboxylic acid, 1,2-cyclohexanedicarboxylic acid, 1,4-cyclohexanedicarboxylic acid, 2,5-norbornanedicarboxylic acid, and the like. These dicarboxylic acids are typically in the form of acid anhydrides.

The aliphatic diol utilized to produce the aromatic or aliphatic (e.g. polyester or polycarbonate) polyol typically comprises a straight-chain or branched alkylene group such as ethylene glycol, diethylene glycol, propylene glycol, 1,3-propanediol, 1,3-butanediol, 1,4-butanediol, 1,5-pentanediol, 1,6-hexanediol, 1,7-heptanediol, 1,8-octanediol, 1,9-nonanediol, 1,10-decanediol, 2,4-dimethyl-2-ethylhexane-1,3-diol, 2,2-dimethyl-1,3-propanediol (neopentyl glycol), 2-ethyl-2-butyl-1,3-propanediol, 2-ethyl-2-isobutyl-1,3-propanediol, 3-methyl-1,5-pentanediol, 2,2,4-trimethyl-1,6-hexanediol, octadecanediol, and the like. In typical embodiments, at least one of the aliphatic diols utilized to product the aromatic or aliphatic polyester polyol comprises a straight-chain or branched alkylene group (e.g. $R_1$ in the formulas below) comprising at least 4, 5 or 6 carbon atoms and typically no greater than 24 or no greater than 36. In some embodiments, the straight-chain or branched alkylene group comprises no greater than 12 or 8 carbon atoms. In some embodiments, straight-chain alkylene groups are preferred.

In some embodiments, the polyol is a polycaprolactone polyol as can be obtained by subjecting a cyclic ester monomer such as epsilon-caprolactone or sigma-valerolactone to ring-opening polymerization. Polycaprolactone polyols comprise an alkylene group having 5 carbons atom.

In other embodiments, the polyol is a polycarbonate polyol as can be obtained from the reaction of aliphatic diols such as butanediol-(1,4) and/or hexanediol-(1,6) with phosgene, diaryl-carbonates such as diphenylcarbonate or with cyclic carbonates such as ethylene or propylene carbonate. Also suitable are polyester carbonates obtained from the above-mentioned polyesters or polylactones with phosgene, diaryl carbonates or cyclic carbonates. The preparation of the polyester or polycarbonate polyol generally includes utilizing at last one aliphatic diol as previously described. The alkylene group of the aliphatic diol and (e.g. aromatic) polyester or polycarbonate polyol may comprise hydrophobic substituents such halogen substituents. However, such alkylene group generally lacks hydrophilic groups, particularly ether groups such as ethylene oxide and propylene oxide (e.g. repeat) units. Without intending to be bound by theory, it is believed that the inclusion of polyols with hydrophilic groups detracts from the chemical resistance of the resulting polyurethane.

In typical embodiments, a single aliphatic diol is utilized in the preparation of the (e.g. aromatic polyester) polyol. In this embodiment, the aliphatic diol comprises an alkylene group comprising at least 4, 5, or 6 carbon atoms as previously described. Alternatively, two or more aliphatic diol may be utilized in the preparation of the (e.g. aromatic polyester) polyol wherein at least one of such diols comprises an alkylene group comprising at least 4, 5, or 6 carbon atoms as previously described. When a mixture of aliphatic diols are utilized, at least 50, 60, 70, 80, 90 or 95 wt-% of the total amount of diol (or total $R_1$ alkylene groups) are alkylene groups comprising at least 4, 5, or 6 carbon atoms as previously described.

The polyol is typically a polymer. The (e.g. aromatic polyester) polyol typically has an equivalent weight (molecular weight per hydroxyl group) ranging from about 250 to about 30000. In some embodiments, the equivalent weight of the (e.g. aromatic polyester) polyol is no greater than 20000, 10000, 8000, 7000, 6000, 5000, 4000, 3500, 3000, 2500, or 2000; or between 500 and 30000, 2000 and 20000, 2000 and 10000, or between 2000 and 4000. In the case of diols, the molecular weight of the (e.g. aromatic polyester) polyol is twice that of the equivalent weight just described. In the case of triols, the molecular weight of the (e.g. polyester) polyol is three times the equivalent weight just described.

In one embodiment, the aliphatic polyester polyol may comprise repeat units comprising an ($R_1$) alkylene group and a terminal ester group or more than one ($R_1$) alkylene group bonded by means of an ester linkage and a terminal ester group.

In another embodiment, the aliphatic polycarbonate polyol may comprise repeat units comprising an ($R_1$) alkylene group and a terminal carbonate group or more than one ($R_1$) alkylene group bonded by means of a carbonate linkage and a terminal carbonate group.

In another embodiment, the aromatic polyester polyol may comprise repeat units comprising an aromatic (e.g. phthalate) group (of the dicarboxylic acid) bonded to the ($R_1$) alkylene group (of the aliphatic diol) by ester linkages. In this embodiment, the ratio of six-member rings to alkylene groups having at least 4, 5, or 6 carbon atoms is about 1:1 and may range from about 1.5:1 to 1:1.5.

The polyol is selected to have certain solubility parameters computed employing group contribution methods as described in the paper by K. L. Hoy, J. Coated Fabrics, Volume 19, 53 (1989). The calculations were carried out employing the program Molecular Modeling Pro Plus from Norgwyn Montgomery Software, Inc. (North Wales, Pa.)

In favored embodiments, the polyol has a total solubility parameter of at least 9.8, 9.9, or 10 $(cal/cm^3)^{1/2}$. The total solubility parameter of the polyol is typically no greater than 14 $(cal/cm^3)^{1/2}$. In some embodiments, the total solubility parameter is no greater than 13, 12.5, 12, 11.5 or 11 $(cal/cm^3)^{1/2}$.

The hydrogen bonding solubility parameter of the polyol is typically at least 3.0, 3.1, 3.2, 3.3, 3.4, or 3.5 $(cal/cm^3)^{1/2}$ and typically no greater than 6 $(cal/cm^3)^{1/2}$. In some embodiments, the hydrogen bonding solubility parameter of the polyol is no greater than 5.5 or 5.0 $(cal/cm^3)^{1/2}$. In some embodiments, the dispersion solubility parameter can range from about 7 to 9 $(cal/cm^3)^{1/2}$. Further, the polar solubility parameter can range from about 4 to 6 $(cal/cm^3)^{1/2}$.

The following table depicts several polyols having the total solubility parameter and hydrogen bonding solubility parameter just described in comparison to a polypropylene glycol polyol having a solubility below the specified range.

TABLE A

| | Solubility Parameters $(cal/cm^3)^{1/2}$ | | | |
|---|---|---|---|---|
| Polyol Structure | Total | Dispersion | Polar | Hydrogen Bonding |
| Polyester polyol available from Stepan Company under the trade designation "PH-56". | | | | |
| PH-56 | 10.6 | 7.8 | 5.5 | 4.4 |
| Polycaprolactone polyol available from Perstorp UK Ltd. under the trade designation "Capa 2200". | | | | |
| Capa 2200 | 10.0 | 8.1 | 4.6 | 3.6 |
| Polyester Polyol available from Stepan Company under the trade designation "PC-205P-56". | | | | |
| PC-205P-56 | 10.2 | 8.0 | 4.9 | 3.9 |

TABLE A-continued

| | Solubility Parameters (cal/cm³)^(1/2) | | | |
|---|---|---|---|---|
| Polyol Structure | Total | Dispersion | Polar | Hydrogen Bonding |

Polyester polyol available from Chemtura Corporation under the trade designation "Fomrez 44-55".

| Fomrez 44-55 | 10.4 | 7.9 | 5.3 | 4.2 |

Polycarbonate polyol available from Bayer Materials Science LLC under the trade designation "Desmophen C2200."

| Desmophen C2200 | 10.5 | 8.0 | 5.2 | 4.3 |

Polypropylene glycol available from Bayer Materials Science LLC under the trade designation "PPG 2000".

| PPG 2000 | 9.6 | 8.1 | 4.5 | 2.8 |

In some favored embodiments, an aromatic polyester polyol is utilized that can be obtained by reacting an aromatic ortho- or meta-dicarboxylic acid (anhydride) component and an aliphatic diol component. Thus, the polyol component comprises polymerized units of an ortho- or meta-phthalate and comprises polymerized units of an alkylene group comprising at least 4 carbon atoms.

In one embodiment, the polyester polyol (prepared from isophthalic acid or phthalic acid) has the following structure:

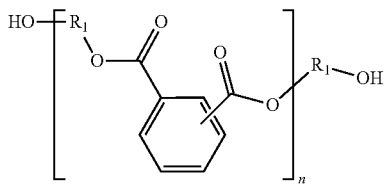

wherein $R_1$ is independently an alkylene group comprising at least 4 carbon atoms, n is at least 2, 3, 4 or 5, and the ester group substituents are bonded to the ring at an ortho- or meta-position.

In some embodiments, n is no greater than 25, 20, 15, or 10.

When the aromatic polyester polyol comprises ortho- or meta-ester moieties, the polyester polyol tends to have a low glass transition temperature, e.g. less than 0, 5, or 10° C. Further, such aromatic polyester polyols tend to be (amorphous) viscous liquids at 25° C. In some embodiments, the aromatic polyester polyols have a viscosity of less than 10,000 or 5,000 cP at 80° C.

Aromatic polyester polyols derived from ortho-phthalic acid are commercially available from Stepan under the trade designation Stepanpol™ and have the following structure:

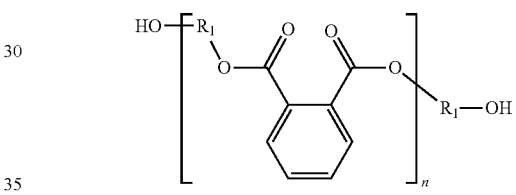

When the aromatic polyester polyol is derived from isoterephthalic acid, the polyester polyol may have the following structure:

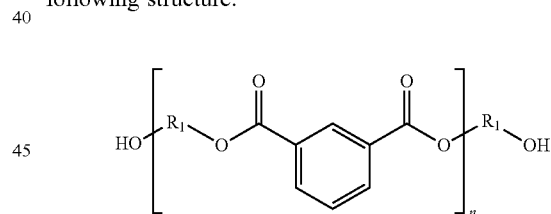

In some favored embodiments, the aromatic polyester diol(s) depicted above are the primary or sole hydroxyl-functional reactant and sole polyol of the polyurethane. In other embodiments, other (e.g. aliphatic polyester, polycaprolactone, or polycarbonate) diol(s) having the previously described solubility parameter(s) are the primary or sole hydroxyl-functional reactant and sole polyol of the polyurethane.

Polyols (e.g. diols) having the previously described solubility parameter(s) are the primary polyol of the polyurethane, such polyols are present in an amount of at least 50, 55, 60, 65, 70, 75, 80, 85, 90, 95 or 99 wt-% of the total amount of polyol components. In some embodiments, aromatic polyester diol(s) are the primary polyol of the polyurethane and are present in an amount of at least 50, 55, 60, 65, 70, 75, 80, 85, 90, 95 or 99 wt-% of the total amount of polyol components. The polyol component may further comprise 1, 5, 10, 15, 20, 25, 30, 35, 40, 45 or 50 wt-% of another polyol or other polyols, such as chain extenders and crosslinkers. In order to maintain the heat resistance and/or chemical resistance contributed by the aromatic polyester diol(s), it is preferred that the other polyol(s) comprise little or no hydrophilic groups, particularly ether groups such as ethylene oxide and propylene oxide (e.g. repeat) units, for the reasons previously described.

In some embodiments, the hydroxyl number of the aromatic polyester polyol or other polyol having the previously described solubility parameters (i.e. prior to reacting with the polyisocyanate component) is at least 5, 10, 25, 30, or 40 mg KOH/g and in some embodiments no greater than 200, 150, 100, 90, 80, or 70 mg KOH/g. In some embodiments, the water content of the aromatic polyester polyol of other polyol is no greater than 0.10 or 0.05 wt-% of the polyol. In some embodiments, the Gardner color of the aromatic polyester polyol or other polyol is no greater than 3, 2, or 1. In some embodiments, the acid number of the aromatic polyester polyol or other polyol is no greater than 5, 4, 3, 2, or 1 mg KOH/g or in other words no greater than 0.005, 0.004, 0.003, 0.002, or 0.001 wt-% of the polyol. Likewise, the polyurethane polymer also comprises a low concentration of acid, as just described.

The polyisocyanate component may comprise various polyfunctional isocyanate compounds. Examples of such polyfunctional isocyanate compound include polyfunctional aliphatic isocyanate compounds, polyfunctional aliphatic cyclic isocyanate compounds, and a polyfunctional aromatic isocyanate compounds.

Examples of the polyfunctional aliphatic isocyanate compounds include trimethylene diisocyanate, tetramethylene diisocyanate, hexamethylene diisocyanate, pentamethylene diisocyanate, 1,2-propylene diisocyanate, 1,3-butylene diisocyanate, dodecamethylene diisocyanate, and 2,4,4-trimethylhexamethylene diisocyanate.

Examples of the polyfunctional aliphatic cyclic isocyanate compounds include 1,3-cyclopentene diisocyanate, 1,3-cyclohexane diisocyanate, 1,4-cyclohexane diisocyanate, isophorone diisocyanate, hydrogenated diphenylmethane diisocyanate, hydrogenated xylylene diisocyanate, hydrogenated tolylene diisocyanate, hydrogenated tetramethylxylene diisocyanate, and bio-based polyfunctional aliphatic cyclic isocyanates, such as 2-heptyl-3,4-bis(9-isocyanatononyl)-1-pentylcyclohexane from BASF Corporation under tradename DDI® 1410.

Examples of the polyfunctional aromatic isocyanate compounds include phenylene diisocyanate, 2,4-tolylene diisocyanate, 2,6-tolylene diisocyanate, 2,2'-diphenylmethane diisocyanate, 4,4'-diphenylmethane diisocyanate, 4,4'-toluidine diisocyanate, 4,4'-diphenyl ether diisocyanate, 4,4'-diphenyl diisocyanate, 1,5-naphthalene diisocyanate, and xylylene diisocyanate.

In some embodiments, the polyfunctional isocyanate comprises a polyisocyanate that is a liquid at 25° C. alone or in combination with minor amount of a polyisocyanate that is a solid at 25° C. In other embodiments, such as when the polyol is an aliphatic polyol, the polyfunctional isocyanate is a solid at 25° C.

In some embodiments, the polyfunctional isocyanate compound comprises an aliphatic cyclic isocyanate compound, such as isophorone diisocyanate (IPDI), hexamethylene diisocyanate, or mixtures thereof. In other embodiments, the polyfunctional isocyanate compound comprises a ortho- or meta-aromatic isocyanate compound, such as 1,4 methylene diphenyl diisocyanate (MDI), m-tetramethylene diisocyanate (TMXDI), or mixtures thereof. Mixtures of (e.g. cyclic) aliphatic and aromatic polyfunctional isocyanate compounds may also be utilized.

In some embodiments, aliphatic polyester polyols (e.g. caprolactone polymers) or aliphatic polycarbonate polyester polyols can be utilized with an aromatic or cyclic aliphatic polyisocyanate. In other embodiments, aromatic polyester or polycarbonate polyols can be utilized with an aliphatic, cyclic aliphatic or aromatic polyisocyanate.

In some embodiments the polyurethane adhesive composition comprises the reaction product of the above-described polyisocyanate and polyol components, and also a functional acid containing compound represented by the formula: (HX)2R1A; wherein A is a functional acid group selected from —CO2M, —OSO3M, —SO3M, —OPO(OM)2, —PO(OM)2, wherein M is H or a cation such as sodium, potassium, and calcium; X is O, S, NH or NR wherein R is an alkylene group comprising 1 to 10 or 1 to 4 carbon atoms; and R1 is an organic linking group having a valency of at least 3, comprising 1 to 50, 1 to 30, 1 to 15, or 1 to 7 carbon atoms, and optionally includes one or more tertiary nitrogen, ether oxygen, or ester oxygen atoms, and is free from isocyanate-reactive hydrogen containing groups. In some embodiments, A is —CO$_2$M, X is O or NH, and R$^1$ is a linear or branched alkylene having from 1 to 7 carbon atoms. Illustrative functional acid containing compounds include dihydroxycarboxylic acids, dihydroxysulphonic acids, dihydroxyphosphonic acids and salts thereof such as dimethylolpropionic acid (DMPA) depicted as follows (or its derivatives from GEO Specialty Chemicals, Inc. under tradename such as DMPA® Polyol HA-0135, DMPA® Polyol HA-0135LV2, DMPA® Polyol HC-0123 and DMPA® Polyol BA-0132):

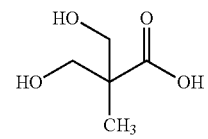

In some embodiments, the amount of functional acid in the polyurethane may be described in terms of the number of millimoles of the functional acid group A (mmol A) per 100 grams of the polyurethane (100 g PU). In this regard, the polyurethane may include between 0.001 and 37 mmol A/100 g PU, 0.1 and 37 mmol A/100 g PU, 1 and 37 mmol A/100 g PU, or between 1 and 25 mmol A/100 g PU. It is believed that the incorporation of a small amount of acid functional groups in the polyurethane may further improve (relative to the polyurethanes of the present disclosure without acid functional groups) adhesion properties as well as the chemical resistance of the material to, for example, polar chemicals.

In some embodiments, the polyurethane comprises at least 25, 30, 35, 40, or 45 mol % of alkylene groups comprising at least 4, 5 or 6 carbon atoms. In some embodiments, the polyurethane comprises no greater than 65 or 60 mol % of alkylene groups comprising at least 4, 5, or 6 carbon atoms, some of which are provided by use of a polyisocyanate comprising a long chain alkylene group such as hexanediisocyanate or isophorone diisocyanate. In other embodiments, such as when the polyisocyanate component is primarily or solely aromatic polyisocyanate(s) the polyurethane comprises no greater than about 55 or 50 mol % of alkylene groups comprising at least 4, 5, or 6 carbon atoms. The alkylene groups typically have no greater than 24, 12, or 8 carbon atoms as previously described. The polyurethane is obtained by reacting a polyol component comprising the aromatic polyester polyol and/or other polyol have the solubility parameter(s) previously described and at least one polyfunctional isocyanate compound. Such composition may optionally comprise other components that do not detract from the desired heat resistance and/or chemical resistance of the polyurethane.

Non-ionic aqueous polyurethane dispersions typically utilize monoalcohols and/or polyols containing polyether groups such as those having ethylene oxide and propylene oxide (repeat) units. The polyether groups function as a water solubilizing group. The concentration of such polyether groups is typically 5-10 wt.-% based on the total weight of the polyurethane.

In contrast, the polyurethane described herein comprises little or no (i.e. zero) nonionic water solubilizing groups. Thus, the polyurethane comprises less than 5, 4, 3, 2, 1, 0.5, 0.1, or 0.05 wt.-% of such non-ionic water solubilizing groups. Further, the polyurethane described herein comprises less than 10, 9, 8, 7, 6, 5, 4, 3, 2, or 1 wt-% of non-ionic water solubilizing groups such as polyether groups.

In some embodiments, the aromatic polyester polyol is reacted with an isocyanate component such that the ratio of hydroxyl equivalents (OH groups) with respect to the NCO isocyanate equivalents (NCO groups) is about 1:1. The hydroxyl content of the resulting polyurethane is no greater than about 0.5 wt-%.

In other embodiments, the polyurethane polymers can be prepared by the reaction of a stoichiometric excess of organic polyisocyanate. The molar ratio of NCO to OH is typically about 1.3 to 1 or 1.2 to 1 or 1.1 to 1

In this embodiment, the NCO terminal groups are typically further reacted with a multi-functional polyol. Suitable multi-functional polyols may include two or more hydroxyl groups such as, for example, branched adipate glycols, trimethylolpropane, 1,2,6-hexanetriol, trimethylolethane, pentaerythritol, dipentaerythritol, tripentaerythritol and the like.

In other embodiments, the polyurethane polymers can be prepared by the reaction of a stoichiometric excess of polyol. The molar ratio of OH to NCO is typically about 1.3 to 1 or 1.2 to 1 or 1.1 to 1.

In this embodiment, the OH terminal groups are typically further reacted with a multi-functional polyisocyanate. Suitable multi-functional polyisocyanates may include two or more isocyanate groups such as, for example, Desmodur N-3300, Desmodur N-3390 and Desmodur N-3400 from Bayer.

In addition to urethane linkages, polyurethane can contain additional groups as known in the art, provided that such additional groups do not detract from the desired heat and/or chemical resistance. In typical embodiments, the polyurethane does not contain (terminal) silyl groups.

When reacting the polyol component(s) with the isocyanate component(s), the reaction temperature is typically in the range of from about 60° C. to about 90° C. depending on the selection of respective reactants and selection of catalyst. The reaction time typically ranges from about 2 to about 48 hours.

The polyurethane compositions are typically prepared with a catalyst as known in the art. The amount of catalyst can range up to about 0.5 parts by weight of the polyurethane. In some embodiments, the amount of catalyst ranges from about 0.001 to about 0.05 wt.-% of the polyurethane. Examples of useful catalysts include but are not limited to those selected from the group consisting of tin II and IV salts such as stannous octoate and dibutyltin dilaurate, and dibutyltin diacetate; tertiary amine compounds such as triethyl amine and bis(dimethylaminoethyl) ether, morpholine compounds such as beta, beta'-dimorpholinodiethyl ether, bismuth carboxylates, zinc-bismuth carboxylates, iron (III) chloride, potassium octoate, and potassium acetate.

Solvents can be utilized to control the viscosity of the polyurethane. Examples of useful solvents (which are typically volatile organic compounds) added for this purpose include but are not limited ketones (e.g. methyl ethyl ketone, acetone), tertiary alcohols, ethers, esters (e.g. ethyl acetate), amides, hydrocarbons, chlorohydrocarbons, chlorocarbons, and mixtures thereof.

The resulting polyurethane typically has a molecular weight (Mw) of at least 30,000 or 40,000, or 50,000 g/mole as determined by the test method described in the examples. The molecular weight (Mw) of the polyurethane is typically no greater than 500,000 g/mole, 300,000 g/mole, or in some embodiments no greater than 275,000 g/mole or 250,000 g/mole. In some embodiments the polyurethane has a molecular weight (Mw) of between 30,000 and 500,000 g/mole, 50,000-300,000 g/mole, or 100,000-200,000 g/mole.

In some embodiments, the polyurethane adhesives of the present disclosure may include a chemical crosslinking agent. Generally, any suitable chemical crosslinking agent may be used. Exemplary chemical crosslinking agents include covalent crosslinkers such as bisamides, epoxies, melamines, multi-functional amines and aziridines; and ionic crosslinking agents such as metal oxides and organometallic chelating agents (e.g., aluminum acetylacetonate). The amount of crosslinking agent included depends on well-understood factors such as the desired degree of crosslinking and the relative effectiveness of the crosslinking agent in the particular system. Crosslinking of the polyurethane using chemical crosslinking agents may be initiated using any conventional technique, such as thermal initiation. In some embodiments, polyurethane adhesives of the present disclosure may include from 0.1 to 5 wt. % or 0.1 to 1 wt. % of a bisamide crosslinker based on the total weight of the polyurethane. Alternatively, or additionally, in some embodiments, the polyurethane adhesives of the present disclosure may 0.1 to 5 wt. % or 0.1 to 2 wt. % of aluminum acetylacetonate crosslinker based on the total weight of the polyurethane. It is believed that the addition of a chemical crosslinking agent may further enhances the shear and cohesive strength of the adhesive, as well as the chemical and high temperature creep resistance. As an alternative to, or in addition to chemical crosslinking, the polyurethanes of the present disclosure may be crosslinked by subjecting the polyurethanes to gamma, electron beam, or ultraviolet radiation (with or without a photoinitiator).

In some embodiments, the pressure sensitive adhesive comprises the polyurethane polymer described herein dissolved in a non-aqueous organic solvent. The organic solvent content typically ranges from about 2 wt. % to 98 wt. %. By non-aqueous, it is meant that the liquid medium contains less than 3, 2, or 1 wt. % water.

In addition to the polyurethane, the pressure sensitive adhesive composition may optionally include one or more additives such as (e.g. inorganic oxide) fillers such as (e.g. fumed) silica and glass bubbles, tackifiers, adhesion promoters, plasticizers, (e.g. chemical) foaming agents, thixotropic agents, ultraviolet stabilizers, antioxidants, antistatic agents, colorants, impact resistance aids, flame retardants (e.g. zinc borate), and the like.

In some embodiments, the pressure sensitive adhesive composition comprises tackifiers and/or plasticizers to adjust the adhesion. In this embodiment, the total amount of tackifier and/or plasticizer of the adhesive composition is typically no greater than 50, 40, 30, 20, 15, 10, or 5 wt.-% solids of the total adhesive composition. In other embodiments, the pressure sensitive adhesive composition comprises little of no (i.e. zero) tackifiers and/or plasticizers. In this embodiments, the adhesive composition comprises no greater than 4, 3, 2, 1, 0.5, 0.1, or 0.05 wt-% of tackifer and/or plasticizer.

When the adhesive composition comprises little or no tackifier and/or plasticizer, the pressure sensitive adhesive properties (e.g. tack, peel adhesion) are generally contributed by the $R_1$ group of the polyurethane (e.g. aromatic or aliphatic polyester or polycarbonate polyol). Without intending to be bound by theory, the tack and peel adhesion can be increased by use of a longer branched alkylene group and/or by reducing the crosslinking. Conversely, the tack and peel adhesion can be decreased by use of a shorter branched alkylene group or by increasing the crosslinking. The adhesion can also be adjusted by the addition of other aliphatic polyols having longer or shorter alkylene groups.

When it is desired for the pressure sensitive adhesive composition to be transparent, the adhesive is typically free of fillers having a particle size greater than 100 nm that can detract from the transparency of the adhesive composition. In this embodiment, the total amount of filler of the adhesive composition is no greater than 10, 9, 8, 7, 6, 5, 4, 3, or 2 wt-% solids of the adhesive composition. In some favored embodiments, the adhesive composition comprises no greater than 1, 0.5, 0.1, or 0.05 wt-% of filler.

However, in other embodiments, the pressure sensitive adhesive may comprise higher amounts of inorganic oxide filler such as fumed silica.

In some embodiments, the pressure sensitive adhesive comprises colorants such as pigments and dyes including titania and carbon black. The concentration of such pigments and dyes can range up to about 20 wt-% of the total composition.

The inclusion of inorganic oxides such as (e.g. fumed) silica and titania can increase the tensile strength of the adhesive composition.

A laminating tape can be formed by coating the polyurethane compositions on a backing or release liner using conventional coating techniques. For example, these compositions can be applied by methods such as roller coating, flow coating, dip coating, spin coating, spray coating knife coating, and die coating. Coating thicknesses may vary. The composition may be of any desirable concentration for subsequent coating, but is typically at least 20 or 25 wt-% polyurethane polymer solids in an organic solvent. In some embodiments, the coating comprises to greater than about 60 wt-% solids polyurethane. The desired concentration may be achieved by further dilution of the coating composition, or by partial drying. The coating thickness may vary depending on the desired thickness of the pressure sensitive adhesive layer.

The thickness of the pressure sensitive adhesive layer is typically at least 10, 15, 20, or 25 microns (1 mil) ranging up to 500 microns (20 mils) thickness. In some embodiments, the thickness of the pressure sensitive adhesive layer is no greater than 400, 300, 200, or 100 microns. The pressure sensitive adhesive can be coated in single or multiple layers.

The pressure sensitive adhesive composition may be coated upon a variety of flexible and inflexible backing materials using conventional coating techniques to produce a single coated or double coated pressure sensitive adhesive tape. The tape may further comprise a release material or release liner. For example, in the case of a single-sided tape, the side of the backing surface opposite that where the adhesive is disposed is typically coated with a suitable release material. Release materials are known and include materials such as, for example, silicone, polyethylene, polycarbamate, polyacrylics, and the like. For double coated tapes, second layer of adhesive is disposed on the opposing surface of the backing surface. The second layer may also comprises the polyurethane pressure sensitive adhesive as described herein or a different adhesive composition. Flexible substrates are defined herein as any material which is conventionally utilized as a tape backing or may be of any other flexible material. Examples include, but are not limited to polymeric films, woven or nonwoven fabrics; metal foils, foams (e.g., polyacrylic, polyethylene, polyurethane, neoprene), and combinations thereof (e.g. metallized polymeric film). Polymeric film include for example polypropylene (e.g. biaxially oriented), polyethylene (e.g. high density or low density), polyvinyl chloride, polyurethane, polyester (polyethylene terephthalate), polycarbonate, polymethyl (meth)acrylate (PMMA), polyvinylbutyral, polyimide, polyamide, fluoropolymer, cellulose acetate, cellulose triacetate, and ethyl cellulose. The woven or nonwoven fabric may comprise fibers or filaments of synthetic or natural materials such as cellulose (e.g. tissue), cotton, nylon, rayon, glass, ceramic materials, and the like.

A substrate may be bonded by the pressure sensitive adhesive or laminating tape described herein. The substrate may comprise the same materials as just described for the backing.

One method of bonding comprises providing a first substrate and contacting a surface of the first substrate with the pressure sensitive adhesive (e.g. laminating tape or protective film). In this embodiment, the opposing surface of the pressure sensitive adhesive is typically temporarily covered by a release liner.

In other embodiments, the method further comprises contacting the opposing surface of the pressure sensitive adhesive to a second substrate. The first and second substrate may be comprised of various materials as previously described such as metal, an inorganic material, an organic polymeric material, or a combination thereof.

In some methods of bonding, the substrate, pressure sensitive adhesive, or combination thereof may be heated to reduce the storage modulus (G') and thereby increase the (e.g. peel) adhesion. The substrate and/or pressure sensitive adhesive may be heated to a temperature up to 30, or 35, or 40, or 45, or 50, or 55, or 60, or 65 or 70° C. In some embodiments, the substrate(s) together with the adhesive bonded to the substrate(s) by means of the initial peel adhesion at ambient temperature (e.g. 25° C.) is heat in an oven to the desired temperature. In other embodiments, the substrate and/or pressures sensitive adhesive is heat by means of a hot air gun.

The transparent adhesive composition described herein may also be disposed on a transparent film for use as a removable or permanent surface protection film. In some embodiments, the pressure sensitive adhesive and transparent film having a transmission of visible light of at least 90 percent.

The pressure sensitive adhesive, laminating tapes, and protective films described herein are suitable for use in the areas of electronics, appliances, automotive, and general industrial products. In some embodiments, the pressure sensitive adhesive and laminating tapes can be utilized in (e.g. illuminated) displays that can be incorporated into household appliances, automobiles, computers (e.g. tablets), and various hand-held devices (e.g. phones).

The presently disclosed adhesive composition can be laminated to solid substrates at ambient temperature (25° C.) and provide good high temperature/humidity stability and chemical resistance. The superior oil (e.g. oleic acid) and alcohol resistance of the presently disclosed adhesive composition makes it attractive for various applications including automotive, aerospace, electronics and appliance markets where maintaining adhesive bond strength under high temperature/humidity and chemical environment are of importance.

In some embodiments, the pressure sensitive adhesive and laminating tapes described herein are suitable for bonding internal components or external components of an illuminated display devices such as liquid crystal displays ("LCDs") and light emitting diode ("LEDs") displays such as cell phones (including Smart phones), wearable (e.g. wrist) devices, car navigation systems, global positioning systems, depth finders, computer monitors, notebook and tablet computer displays.

In some embodiments, the pressure sensitive adhesive or laminating tape may exhibit a low level of adhesion to glass or stainless steel. For example, the room temperature 180° peel values can be about 5, 10, 15 or 20 N/dm at a 300 mm/minute peel rate after a 24 hour dwell time at 25° C. (as further described in the test method in the examples). In other embodiments, the 180° peel values of the pressure sensitive adhesive or laminating tape (e.g. heat bondable) can be higher, for example at least 25, 30, 35, 40, 45, 50, 55, or 60 N/dm.

In some embodiments, the pressure sensitive adhesive or laminating tape may exhibit the same of higher level of adhesion to glass or stainless steel after exposure to elevated temperatures and humidity, such as after a 72 hour dwell time at 65° C. and 90% relative humidity. In some embodiments, the increase in adhesion is no greater than 300%, 250%, 200%, 150%, 100%, 90%, 80%, or 70% (as determine by subtracting the 24 hr room temperature value from the aged peel value, dividing by the 24 hr room temperature value and multiplying by 100%.

In some embodiments, the pressure sensitive adhesive or laminating tape does not dissolve in oleic acid and/or a 70% isopropyl alcohol aqueous solution after 8 hours at 70° C.

In some embodiments, the pressure sensitive adhesive composition has a storage modulus G' as can be measured by Dynamic Mechanical Analysis (as further described in the examples) of less than 1, 0.9, 0.8, 0.7, 0.6 or 0.5 MPa at 25° C. and a frequency of 1 hertz. The storage modulus decreases with increasing temperature. In some embodiments, the pressure sensitive adhesive composition has a storage modulus G' of less than 0.6 or 0.5 at 35° C. and a frequency of 1 hertz. In some embodiments, the pressure sensitive adhesive composition has a storage modulus G' of less than 0.5 or 0.4 at 45° C. and a frequency of 1 hertz. In some embodiments, the pressure sensitive adhesive composition has a storage modulus G' of less than 0.4 or 0.3 at 55° C. and a frequency of 1 hertz. In some embodiments, the pressure sensitive adhesive composition has a storage modulus G' of less than 0.3 or 0.2 at 65° C. and a frequency of 1 hertz. The pressure sensitive adhesive has a storage modulus G' of less than 0.3 at frequency of 1 hertz at a temperature less than 70, or 65, or 60, or 55, or 50, or 45° C.

The pressure sensitive adhesive has a glass transition temperature of less 25° C. as can be measured by Dynamic Mechanical Analysis. In some embodiments, the glass transition temperature is less than 20° C. or 15° C. In some embodiments, the glass transition temperature is above 0° C. In some embodiments, the glass transition temperature is less than 0° C., −10° C., −20° C., −30° C. or −40° C.

In some embodiments, the polyurethanes of the present disclosure may be utilized as a primer. In these embodiments, the polyurethane is formed into a dilute solution (e.g. 2 to 20 wt-% solids) in an organic solvent (e.g. MEK) or solvent mixture. The solution is applied to a substrate and dried. A pressure sensitive adhesive may then applied to the dried primer. The pressure sensitive adhesive may be a polyurethane pressure sensitive adhesive as described herein. Alternatively the pressure sensitive adhesive may be a different pressure sensitive adhesive, such as a different polyurethane or different acrylic adhesive. Polyurethanes of the present disclosure that are the reaction product of the above-described polyisocyanate, polyol, and functional acid containing compounds may be particularly suited for use as primers.

EXAMPLES

Materials

| Designation | Description | Source |
|---|---|---|
| PH-56 | Polyester Polyol Mw = 2000, under trade designation STEPANPOL PH-56 | Stepan Company, Northfield, IL |
| IPDI | Isophorone diisocyanates, under the trade name DESMODUR I | Bayer Materials Science LLC, Pittsburgh, PA |
| TXMDI | META-Tetramethylxylylene Diisocyanate, under the trade name TMXDI | Allnex, Smyrna, GA |
| HDI | Hexamethylene diisocyanate, under the trade name DESMODUR H | Bayer Materials Science LLC, Pittsburgh, PA |
| DESMODUR 2460M | An isomeric mixture of monomeric diphenylmethane diisocyanate under trade designation DESMODUR 2460 M | Bayer Materials Science LLC, Pittsburgh, PA |
| 1,3-BDM | 1,3-Benzenedimethanol as a chain extender | Sigma-Aldrich, St. Louis, MO |
| TMP | 2-Ethyl-(hydroxymethyl)-1,3-propanediol | Alfa Aesar, Ward Hill, MA |
| Ethyl Acetate | Solvent | EMD Millipore Corp. Billerica, MA |

-continued

| Designation | Description | Source |
|---|---|---|
| MEK | Methyl ethyl ketone, solvent | Avantor Performance Materials, Inc Center Valley, PA |
| DBTDA | Dibutyltin diacetate | Sigma-Aldrich, St. Louis, MO |
| DMPA | Dimethylolpropionic Acid | Sigma-Aldrich, St. Louis, MO |
| AlAcAc | Aluminum 2,4-pentanedionate | Alfa Aesar, Ward Hill, MA |
| OA | 90% Oleic Acid | Alfa Aesar, Ward Hill, MA |
| 93005LE | Double coated polyester tape featuring adhesive 3M ™ Type 300LSE Acrylic Adhesive under trade designation 3M 93005LE | 3M Company, St Paul, MN |
| U 42 | Anionic high-molecular-weight polyurethane dispersion under trade designation DISPERCOLL U 42 | Bayer Materials Science LLC, Pittsburgh, PA |
| BAYHYDUR 302 | A hydrophilically-modified polyisocyanate hardener for waterborne two-component (2K) polyurethane (PUR) systems under trade designation BAYHYDUR 302 | Bayer Materials Science LLC, Pittsburgh, PA |
| CAPA 2200 | Polycaprolactone polyol Mw = 2000, under trade designation CAPA 2200 | Perstorp UK Ltd, Warrington, Cheshire WA46HA |
| PPG 2000 | polypropylene glycol Mw = 2000, under trade designation ARCOL POLYOL PPG 2000 | Bayer Materials Science LLC, Pittsburgh, PA |
| MONDUR MLQ | An isomeric mixture of monomeric diphenylmethane diisocyanate under trade designation MONDUR MLQ | Bayer Materials Science LLC, Pittsburgh, PA |

Test Methods

Peel Adhesion Strength

Samples were prepared by slitting uniform test strips 12.7 mm×127 mm in dimension from each of adhesive tape samples prepared. Two replicates was prepared for each Example and Comparative Example tape samples. Then the exposed adhesive surface of the test strips were adhered along the length of a stainless steel (SS) plate measuring 5.1 cm wide by 12.7 cm long by 0.12 cm thick (Type 304 with a bright annealed finish, obtained from ChemInstruments, Incorporated, Fairfield, Ohio) and rolled down 5 times using a 2.0 kg rubber roller. The plate was cleaned prior to applying the tape by wiping with acetone once then with heptane three times using a tissue paper (trade designation KIMWIPE, available from Kimberly-Clark Corporation, Irving, Tex.). After being conditioned for 1 hr and 24 hr, respectively, at 50% relative humidity (RH) at room temperature (RT), the peel adhesion strength was evaluated using a tensile tester (MTS Insight, available from MTS Systems, Corporation, Eden Prairie, Minn.) equipped with 1000 N load cell, using a crosshead speed of 300 mm/min, at an angle of 180° with the test specimen held in the bottom clamp and the tail in the top clamp. The average of two test specimens was reported in N/decimeter (N/dm). This number was reported as the "Peel on SS after 1 hrs RT Dwell" and "Peel on SS after 24 hrs RT Dwell", respectively.

Another set of test samples (5 mm by 127 mm) were prepared as described above (i.e., after being conditioned for 24 hrs at 50% RH at room temperature), were dwelled for 72 hrs at 65° C. and 80% RH and then return to constant temperature room for 24 hours prior to adhesion testing. The peel adhesion strength was evaluated using a tensile tester (MTS Insight, available from MTS Systems, Corporation, Eden Prairie, Minn.) equipped with 1000 N load cell, using a crosshead speed of 300 mm/min, at an angle of 180° with the test specimen held in the bottom clamp and the tail in the top clamp. The average of two test specimens was reported in N/decimeter (N/dm). This number was reported as "Aged Peel"

Method for Chemical Resistance Test

Samples were prepared by slitting test strips 0.5 inch×0.5 inch (1.27 cm×1.27 cm) from each of adhesive transfer tape samples prepared. Then, release liner on one surface removed and the test strips were attached (stuck) to the bottom of a petri dish. The release liner on the second, exposed surface of the test strips were removed and the petri dish containing the attached sample test strips were set aside to dwell at room temperature (about 23° C.) for 15 mins. The test strips were then submerged in either oleic acid or a mixture of isopropyl alcohol and water at a weight ratio of 70:30 (IPA/$H_2O$) at 70° C. for 8 hrs. The resistance of the adhesive sample to oleic acid or IPA/$H_2O$ mixture was rated using the following guidelines and reported.

TABLE 1

Chemical resistance Criteria

| Observation criteria | Chemical Resistance Rating |
|---|---|
| Adhesive sample came off the petri dish or dissolved completely | 1 |
| Adhesive sample partially detached or dissolved along the edge | 3 |
| Adhesive sample did not detach or dissolve | 5 |

Polymer Molecular Weight Measurement

The molecular weight distribution of the compounds was characterized using gel permeation chromatography (GPC). The GPC instrumentation, which was obtained from Waters Corporation (Milford, Mass., USA), included a high pressure liquid chromatography pump (Model 1515HPLC), an auto-sampler (Model 717), a UV detector (Model 2487), and a refractive index detector (Model 2410). The chromatograph was equipped with two 5 micrometer PL gel MIXED-D columns available from Varian Inc. (Palo Alto, Calif., USA).

Samples of polymeric solutions were prepared by dissolving dried polymer samples in tetrahydrofuran at a concentration of 1.0 percent (weight/volume) and filtering through a 0.2 micrometer polytetrafluoroethylene filter that is available from VWR International (West Chester, Pa., USA). The resulting samples were injected into the GPC and eluted at a rate of 1 milliliter per minute through the columns maintained at 35° C. The system was calibrated with polystyrene standards using a linear least squares analysis to establish a standard calibration curve. The weight average molecular weight (Mw) and the polydispersity index (weight average molecular weight divided by number average molecular weight (Mn)) were calculated for each sample against this standard calibration curve.

Dynamic Mechanical Analysis

Dynamic mechanical analysis (DMA) of each sample was accomplished using an ARES G2 parallel plate rheometer (TA Instruments) to characterize the physical properties of each sample as a function of temperature. For each sample, approximately 0.1 g of polymer material was centered between 8 mm diameter parallel plates of the rheometer and compressed until the edges of the sample were uniform with the edges of the top and bottom plates. The furnace doors that surround the parallel plates and shafts of the rheometer were shut and the temperature was raised to 100° C. and held for 5 minutes to relax any residual stress. Axial force was then set at 0, to maintain contact between the material and the plates. The temperature was set to −50° C., and then temperature was ramped from −50° C. to 200° C. at 5° C./min while the parallel plates were oscillated at a frequency of 1 Hz and an initial strain amplitude of 0.15%. The strain was increased by 50% of the current value whenever the measured torque dropped below 1 g-cm, with a maximum allowed strain amplitude of 10%. The storage modulus (G') at various temperature including 25° C. and Tg was reported.

Example Overview

The following examples illustrate the usefulness of this invention without attempt to provide exhaustive embodiments of all suitable choices for components. Examples 1-16 (E1-E16) provide pressure sensitive adhesive (PSA) compositions while Comparative Examples (CE1-CE5) provide compositions outside the scope of this invention. Primer Examples 17-24 (E17-E24) provide compositions for using the PSA as a primer coating. Examples 25-38 (E25-E38) provide combinations of PSA examples plus Primer examples to report peel strength and chemical resistance on the resultant combination. Comparative Examples CE6 and CE7 show adhesive and primer combinations outside the scope of this invention.

Examples 1 (E1)

To a resin reaction vessel equipped with a mechanical stirrer, a condenser and a nitrogen inlet were added 30.0 g hydroxyl terminated polyester PH-56 (a hydroxyl value of 56 mg KOH/g) and 10 g of ethyl acetate. The solution was heated up to 75° C., then added with stirring 0.06 g 10 wt % DBTDA in ethyl acetate and 3.32 g of IPDI. The temperature was maintained at 75±2° C. until no free NCO group was observed by FT-IR. Then 52.0 g ethyl acetate was added to adjust the solids content of up to 35 wt %, resulting in clear and transparent polyurethane PSA solution.

Example 2 (E2)

To a resin reaction vessel equipped with a mechanical stirrer, a condenser and a nitrogen inlet were added 30.0 g hydroxyl terminated polyester PH-56 (a hydroxyl value of 56 mg KOH/g) and 10.0 g of ethyl acetate. The solution was heated up to 75° C., then added with stirring 0.06 g 10 wt % DBTDA in ethyl acetate and 3.66 g of TMXDI. The temperature was maintained at 75±2° C. until no free NCO group was observed by FT-IR. Then 52.5 g ethyl acetate was added to adjust the solids content of up to 35 wt %, resulting in clear and transparent polyurethane PSA solution.

Example 3 (E3)

To a resin reaction vessel equipped with mechanical stirrer, a condenser and a nitrogen inlet were added 30.0 g hydroxyl terminated polyester PH-56 (a hydroxyl value of 56 mg KOH/g) and 10.0 g of ethyl acetate. The solution was heated up to 75° C., then added with stirring 0.06 g 10 wt % DBTDA in ethyl acetate and 2.52 g of HDI. The temperature was maintained at 75±2° C. until no free NCO group was observed by FT-IR. Then 50.4 g ethyl acetate was added to adjust the solids content of up to 35 wt %, resulting in clear and transparent polyurethane PSA solution.

Example 4 (E4)

To a resin reaction vessel equipped with a mechanical stirrer, a condenser and a nitrogen inlet were added 30.0 g hydroxyl terminated polyester PH-56 (a hydroxyl value of 56 mg KOH/g) and 10.0 g of ethyl acetate. The solution was heated up to 75° C., then added with stirring 0.06 g 10 wt % DBTDA in ethyl acetate and 3.67 g of IPDI. The temperature was maintained at 75±2° C. until NCO content reached was theoretical NCO value, which was determined by standard dibutylamine back titration method. Upon obtaining the theoretical NCO value, the polyurethane was then slightly crosslinked by adding TMP of 0.13 g, and allowed to react until no free NCO group was observed by FT-IR. Then 24.0 g ethyl acetate was added to adjust the solids content of up to 50 wt %, resulting in clear and transparent polyurethane PSA solution.

Example 5 (E5)

To a resin reaction vessel equipped with a mechanical stirrer, a condenser and a nitrogen inlet were added 30.0 g hydroxyl terminated polyester PH-56 (a hydroxyl value of 56 mg KOH/g) and 10.0 g of ethyl acetate. The solution was heated up to 75° C., then added with stirring 0.06 g 10 wt % DBTDA in ethyl acetate and 3.83 g of IPDI. The temperature was maintained at 75±2° C. until NCO content reached was theoretical NCO value, which was determined by standard dibutylamine back titration method. Upon obtaining the theoretical NCO value, the polyurethane was then slightly crosslinked by adding TMP of 0.20 g, and allowed to react until no free NCO group was observed by FT-IR. Then 25.0 g ethyl acetate was added to adjust the solids content of up to 50 wt %, resulting in clear and transparent polyurethane PSA solution.

Example 6 (E6)

To a resin reaction vessel equipped with mechanical stirrer, a condenser and a nitrogen inlet were added 30.0 g hydroxyl terminated polyester PH-56 (a hydroxyl value of 56 mg KOH/g) and 10.0 g of ethyl acetate. The solution was heated up to 75° C., then added with stirring 0.06 g 10 wt % DBTDA in ethyl acetate and 4.0 g of IPDI. The temperature was maintained at 75±2° C. until NCO content reached was theoretical NCO value, which was determined by standard dibutylamine back titration method. Upon obtaining the theoretical NCO value, the polyurethane was then slightly crosslinked by adding TMP of 0.268 g, and allowed to react until no free NCO group was observed by FT-IR. Then 45.8 g ethyl acetate was added to adjust the solids content of up to 38 wt %, resulting in clear and transparent polyurethane PSA solution.

Example 7 (E7)

To a resin reaction vessel equipped with mechanical stirrer, a condenser and a nitrogen inlet were added 30.0 g hydroxyl terminated polyester PH-56 (a hydroxyl value of 56 mg KOH/g) and 10.0 g of ethyl acetate. The solution was heated up to 75° C., then added with stirring 0.06 g 10 wt % DBTDA in ethyl acetate and 4.33 g of IPDI. The temperature was maintained at 75±2° C. until NCO content reached was theoretical NCO value, which was determined by standard dibutylamine back titration method. Upon obtaining the theoretical NCO value, the polyurethane was then slightly crosslinked by adding TMP of 0.40 g, and allowed to react until no free NCO group was observed by FT-IR. Then 46.0 g ethyl acetate was added to adjust the solids content of up to 38 wt %, resulting in clear and transparent polyurethane PSA solution.

Example 8 (E8)

To a resin reaction vessel equipped with mechanical stirrer, a condenser and a nitrogen inlet were added 30.0 g hydroxyl terminated polyester PH-56 (a hydroxyl value of 56 mg KOH/g) and 10.0 g of ethyl acetate. The solution was heated up to 75° C., then added with stirring 0.06 g 10 wt % DBTDA in ethyl acetate and 4.40 g of TXMDI. The temperature was maintained at 75±2° C. until NCO content reached was theoretical NCO value, which was determined by standard dibutylamine back titration method. Upon obtaining the theoretical NCO value, the polyurethane was then slightly crosslinked by adding TMP of 0.27 g, and allowed to react until no free NCO group was observed by FT-IR. Then 54.0 g ethyl acetate was added to adjust the solids content of up to 35 wt %, resulting in clear and transparent polyurethane PSA solution.

Example 9 (E9)

To a resin reaction vessel equipped with mechanical stirrer, a condenser and a nitrogen inlet were added 30.0 g hydroxyl terminated polyester PH-56 (a hydroxyl value of 56 mg KOH/g) and 10.0 g of ethyl acetate. The solution was heated up to 75° C., then added with stirring 0.06 g 10 wt % DBTDA in ethyl acetate and 1.099 g of TMXDI and 2.33 IPDI. The temperature was maintained at 75±2° C. until no free NCO group was observed by FT-IR. Then 44.5 g ethyl acetate was added to adjust the solids content of up to 38 wt %, resulting in clear and transparent polyurethane PSA solution.

Example 10 (E10)

To a resin reaction vessel equipped with a mechanical stirrer, a condenser and a nitrogen inlet were added 30.0 g hydroxyl terminated polyester PH-56 (a hydroxyl value of 56 mg KOH/g) and 10.0 g of ethyl acetate. The solution was heated up to 75° C., then added with stirring 0.06 g 10 wt % DBTDL in ethyl acetate and 3.75 g of DESMODUR 2460 M. After 2 h reaction, 20 g ethyl acetate was added to dilute the viscosity of the system. Then, the temperature was maintained at 75° C. for about 10 h or until no free NCO group was observed by FT-IR. Finally 11.50 g ethyl acetate was added to adjust the solids content of up to 45 wt %, resulting in clear and transparent polyurethane PSA solution.

Example 11 (E11)

To a resin reaction vessel equipped with a mechanical stirrer, a condenser and a nitrogen inlet were added 50.0 g hydroxyl terminated polyester PH-56 (a hydroxyl value of 56 mg KOH/g) and 10.0 g of MEK. The solution was heated up to 75° C., then added with stirring 2.8 g 1 wt % DBTDA in MEK and 6.26 g of Mondur MLQ. After 2 h reaction, 20.0 g MEK was added to dilute the viscosity of the system. Then, the temperature was maintained at 75° C. for about 10 h or until no free NCO group was observed by FT-IR. Finally 26.5 g MEK was added to adjust the solids content of up to 50 wt %, resulting in clear and transparent polyurethane PSA solution.

Example 12 (E12)

To a resin reaction vessel equipped with mechanical stirrer, a condenser and a nitrogen inlet were added 30 g hydroxyl terminated polyester PH-56 (a hydroxyl value of 56 mg KOH/g) and 10.0 g of ethyl acetate. The solution was heated up to 75° C., then added with stirring 0.09 g 10 wt % DBTDL in ethyl acetate and 4.13 g of DESMODUR 2460 M. After 2 h reaction, 20 g ethyl acetate was added to dilute the viscosity of the system, the polyurethane was slightly crosslinked by adding 0.1342 g TMP. Then, the temperature was maintained at 75° C. for about 10 h or until no free NCO group was observed by FT-IR. Finally 11.50 g ethyl acetate was added to adjust the solids content of up to 45 wt %, resulting in clear and transparent polyurethane PSA solution.

Example 13 (E13)

To a resin reaction vessel equipped with a mechanical stirrer, a condenser and a nitrogen inlet were added 40.0 g hydroxyl terminated polycaprolactone CAPA 2200 (a hydroxyl value of 56 mg KOH/g) and 50.0 g of MEK. The solution was heated up to 75° C., then added with stirring 0.09 g 10 wt % DBTDA in MEK and 4.98 g of MONDUR MLQ. The temperature was maintained at 75±2° C. until no free NCO group was observed by FT-IR. Then 26.0 g MEK was added to adjust the solids content of up to 37 wt %, resulting in clear and transparent polyurethane PSA solution.

Example 14 (E14)

To a resin reaction vessel equipped with a mechanical stirrer, a condenser and a nitrogen inlet were added 30.0 g hydroxyl terminated polyester PH-56 (a hydroxyl value of 56 mg KOH/g), 1.04 g DMPA and 10.0 g of MEK. The solution was heated up to 75° C., then added with stirring 2.95 g 1 wt % DBTDA in MEK and 7.99 g of Mondur MLQ. After 2 h reaction, 20.0 g MEK and 20.0 g PH-56 was added and stirred at 75° C. for about 10 h or until no free NCO group was observed by FT-IR. Finally 29.0 g MEK was added to adjust the solids content of up to 50 wt %, resulting in clear and transparent polyurethane PSA solution.

Example 15 (E15)

To a resin reaction vessel equipped with a mechanical stirrer, a condenser and a nitrogen inlet were added 30.0 g hydroxyl terminated polyester PH-56 (a hydroxyl value of 56 mg KOH/g), 1.83 g DMPA and 10.0 g of MEK. The solution was heated up to 75° C., then added with stirring 3.0 g 1 wt % DBTDA in MEK and 9.37 g of Mondur MLQ (NCO/OH=0.98). After 2 h reaction, 20.0 g MEK and 20.0 g PH-56 was added and stirred at 75° C. for about 10 h or until no free NCO group was observed by FT-IR. Finally 32.0 g MEK was added to adjust the solids content of up to 50 wt %, resulting in clear and transparent polyurethane PSA solution.

The molecular weight of polyurethanes of E1 to E14 and CE1-CE5 were determined as described above and reported in Table 1, below.

Comparative Example 1 (CE1)

CE1 was a commercially available double coated acrylic type PSA product obtained from 3M Company Saint Paul, Minn. under trade designation 3M 93005LE.

Comparative Example 2 (CE2)

CE2 was prepared by mixing 100 grams of DISPER-COLL U42 with 1.0 gram of BAYHYDUR 302 in a glass jar using mechanical stirring at 300-500 rpm for 10 minutes.

Comparative Example 3 (CE3)

To a resin reaction vessel equipped with a mechanical stirrer, a condenser and a nitrogen inlet were added 40.0 g hydroxyl terminated polypropylene glycol Arcol polyol PPG 2000 (a hydroxyl value of 56 mg KOH/g), 0.54 g TMP and 50.0 g of MEK. The solution was heated up to 75° C., then added with stirring 0.09 g 10 wt % DBTDA in MEK and 6.48 g of Mondur MLQ. The temperature was maintained at 75±2° C. until no free NCO group was observed by FT-IR. Then 30.0 g MEK was added to adjust the solids content of up to 37 wt %, resulting in clear and transparent polyurethane PSA solution.

Comparative Example 4 (CE4)

To a resin reaction vessel equipped with a mechanical stirrer, a condenser and a nitrogen inlet were added 30.0 g hydroxyl terminated polyester PH-56 (a hydroxyl value of 56 mg KOH/g), 3.28 g DMPA and 10.0 g of MEK. The solution was heated up to 75° C., then added with stirring 3.26 g 1 weight % DBTDA in MEK and 11.99 g of Mondur MLQ. After 2 h reaction, 20.0 g MEK and 20.0 g PH-56 was added and stirred at 75° C. for about 10 h or until no free NCO group was observed by FT-IR. Finally 35.0 g MEK was added to adjust the solids content of up to 50 wt %, resulting in clear and transparent polyurethane PSA solution.

Comparative Example 5 (CE5)

To a resin reaction vessel equipped with a mechanical stirrer, a condenser and a nitrogen inlet were added 30.0 g hydroxyl terminated polyester PH-56 (a hydroxyl value of 56 mg KOH/g), 4.9 g DMPA and 10.0 g of MEK. The solution was heated up to 75° C., then added with stirring 3.5 g 1 wt % DBTDA in MEK and 14.95 g of Mondur MLQ. After 2 h reaction, 20.0 g MEK and 20.0 g PH-56 was added and stirred at 75° C. for about 10 h or until no free NCO group was observed by FT-IR. Finally 40.0 g MEK was added to adjust the solids content of up to 50 wt %, resulting in clear and transparent polyurethane PSA solution.

Comparative Example 6 (CE6)

A premix was prepared using 90 parts isooctyl acrylate (IOA), 10 parts acrylic acid (AA), and 0.04 parts 2,2-dimethoxy-2-phenylacetophenone photoinitiator (Irgacure™ 651, available from Ciba Geigy Corp.) This mixture was partially polymerized under a nitrogen-rich atmosphere by exposure to ultraviolet radiation to provide a coatable syrup having a viscosity of about 3000 cps. 0.15 parts of 2,6-bis-trichloromethyl-6-(4-methoxphenyl)-s-triazine and an additional 0.16 parts of Irgacure™ 651 were added to the syrup. To prepare tape from this material, the syrup was then knife coated onto a 2 mil (~51 micrometers) PET film at a thickness of 2 mils. The resulting composite was then exposed to ultraviolet radiation having a spectral output from 300-400 nm with at maximum at 351 nm in a nitrogen-rich environment. An intensity of about 1.0 mW/cm$^2$ was used for the first one-third of the exposure time and an intensity of about 2.2 mW/cm$^2$ was used for the second two-thirds of exposure time, resulting in a total energy of 250 mJ/cm$^2$.

To prepare samples for the peel adhesion strength testing the polyurethane compositions were coated onto a 51 micrometer thick polyester film backing and dried in a 70° C. oven (50° C. in the case of CE2) for 15 minutes to produce a single coated adhesive tape having an adhesive thickness of approximately 50 micrometers.

To prepare samples for the chemical resistance testing the polyurethane compositions were coated on a release liner and dried in a 70° C. oven (50° C. in the case of CE2) for 15 minutes and then the exposed adhesive side was covered with a second release liner to produce adhesive transfer tapes having an adhesive thickness of approximately 50 micrometers.

The polyurethane adhesive samples were tested for their peel adhesion strengths and their chemical resistance ratings using methods described above. The results are summarized in Table 2, below together with comparative examples.

TABLE 2

Polyurethane Adhesive comparisons.

| Example | Mw [Daltons] | —COOH [mmol/ 100 g PU] | Oleic Acid Resistance Rating | IPA/ H$_2$O Resistance Rating | Peel on SS-1 hr @RT [N/dm] | Aged Peel [N/dm] |
|---|---|---|---|---|---|---|
| E1 | 100477 | — | 5 | 5 | 76 | 80 (+5%) |
| E2 | 86511 | — | 3 | 3 | 70 | 170 (+142%) |
| E3 | 131919 | — | 5 | 3 | 84 | 120 (+43%) |
| E4 | 101019 | — | 5 | 5 | 59 | 90 (+53%) |
| E5 | 104235 | — | 5 | 5 | 58 | 91 (+57%) |
| E6 | 93827 | — | 3 | 3 | 35 | 135 (+286%) |
| E7 | 76034 | — | 5 | 5 | 46 | 111 (+141%) |
| E8 | 87126 | — | 5 | 5 | 71 | 131 (+70%) |
| E9 | 61112 | — | 5 | 5 | 77 | 108 (+40) |
| E10 | 92560 | — | 5 | 5 | 78 | 120 (+54%) |
| E11 | 85000 | — | 5 | 5 | 38 | 120 (+216%) |
| E12 | 222681 | — | 5 | 5 | 64 | 91 (+42%) |

TABLE 2-continued

Polyurethane Adhesive comparisons.

| Example | Mw [Daltons] | —COOH [mmol/ 100 g PU) | Oleic Acid Resistance Rating | IPA/ $H_2O$ Resistance Rating | Peel on SS-1 hr @RT [N/dm] | Aged Peel [N/dm] |
|---|---|---|---|---|---|---|
| E13 | 141782 | — | 5 | 3 | 113 | Not Measured |
| E14 | 86500 | 13.05 | 5 | 5 | 71 | 196 (+176%) |
| E15 | 76100 | 22.39 | 5 | 5 | 71 | 183 (+158%) |
| CE1 | N/A | — | 1 | 3 | 78 | 58 (−26%) |
| CE2 | N/A | — | 3 | 1 | 55 | 88 (+60%) |
| CE3 | 103427 | — | 1 | 1 | 76 | Not Measured |
| CE4 | 48800 | 37.44 | 5 | 1 | 19 | 197 (+937%) |
| CE5 | 55700 | 52.24 | 5 | 1 | 0 | 141 (+%) |

N/A means not measured or not available.

Examples E10 and E13 were subjected to Dynamic Mechanical Analysis. The results (units=MPa) were as follows:

TABLE 3

Dynamic Mechanical Analysis reported in [MPa]

|  | 25° C. | 30° C. | 35° C. | 40° C. | 45° C. | 50° C. | 55° C. | 60° C. | 65° C. | 70° C. |
|---|---|---|---|---|---|---|---|---|---|---|
| E10 | 0.67 | 0.55 | 0.48 | 0.41 | 0.39 | 0.34 | 0.29 | 0.26 | 0.22 | 0.18 |
| E13 | 0.53 | 0.46 | 0.40 | 0.34 | 0.30 | 0.24 | 0.20 | 0.17 | 0.14 | 0.11 |

The glass transition temperature (Tg) of Examples E10 and E13 was determined using Dynamic Mechanical Analysis. The results were as follows:
Tg of E10=12.3° C.
Tg of E13=−42° C.

Examples of Utilizing the Polyurethane as a Primer

Polyurethane compositions in this invention can be used as solvent-borne primers for polyurethane or other polyester/polyether-based adhesives as well. To this end, these examples show use diluted polyurethane solutions which were manually applied to the SS panel with a rectangular head swab (CleanTips® Swabs from Texwipe®, Kernersville, N.C., USA), using the minimum amount that will fully coat the surface. The primer coating was allowed to dry at RT for 10 minutes before applying the tape.

Primer Example 17 (E17)

A portion of the Example 10 (E10) solution was diluted to 5 wt % solids with MEK solvent to yield a clear and transparent polyurethane PSA primer solution.

Primer Example 18 (E18)

To a resin reaction vessel equipped with a mechanical stirrer, a condenser and a nitrogen inlet were added 30.0 g hydroxyl terminated polyester PH-56 (a hydroxyl value of 56 mg KOH/g) and 10.0 g of ethyl acetate. The solution was heated up to 75° C., then added with stirring 0.06 g 10 wt % DBTDA in ethyl acetate and 3.66 g of TMXDI. The temperature was maintained at 75±2° C. until no free NCO group was observed by FT-IR. Then MEK was added to adjust the solids content to 5 wt %, resulting in a clear and transparent primer solution.

Primer Example 19 (E19)

A portion of the E11 solution was diluted to 5 wt % solids with MEK solvent to yield a clear and transparent polyurethane PSA primer solution.

Primer Example 20 (E20)

A portion of the E14 solution was diluted to 5 wt % solids with MEK solvent to yield a clear and transparent polyurethane PSA primer solution.

Primer Example 21 (E21)

A portion of the E15 solution was diluted to 5 wt % solids with MEK solvent to yield a clear and transparent polyurethane PSA primer solution.

Primer Example 22 (E22)

Five parts of Aluminum 2,4-pentanedionate (AlAcAc) based on 100 parts dry E14 polymer were added to E21 solution. The presence of carboxyl acid provides functional sites for chemical crosslinking which could provide improvements to temperature and chemical resistance of the Polyurethane and primer compositions.

Primer Example 23 (E23)

A portion of the CE4 solution was diluted to 5 wt % solids with MEK solvent to yield a clear and transparent polyurethane PSA primer solution.

Primer Example 24 (E24)

A portion of the CE5 solution was diluted to 5 wt % solids with MEK solvent to yield a clear and transparent polyurethane PSA primer solution.

Peel Adhesion Testing of Tape with and without Application of a Primer Layer to a Substrate Peel adhesion strength was performed as described in the "Peel Adhesion Strength" test method above, with the following exceptions:

In some instances the peel adhesion testing was performed on stainless steel ("SS") as indicated in the test method. In some instances the peel adhesion testing was performed on a polycarbonate ("PC") substrate (polycarbonate was available from SABIC Innovative Plastics, Pittsfield, Mass., under the trade designation "LEXAN"). The polycarbonate substrate was cleaned by wiping three times with a 2-propanol-saturated wipe.

In some instances, the substrate was primed by applying a thin layer of primer solution with a sponge tip, and then allowing the primer solution to dry at room temperature for 10 minutes. The adhesive strip was then laminated to the primed substrate.

The peel values as summarized in Table 4 for stainless steel (SS) and polycarbonate (PC).

TABLE 4

Combined polyurethane adhesive and primer compositions in comparison

| Example | Pressure Sensitive Adhesive | Primer solution | Test Substrate | Peel strength after 1 hr RT dwell, [N/dm] |
|---|---|---|---|---|
| E25 | E10 | E17 | SS | 80 |
| E26 | E10 | E17 | PC | 240 |
| E27 | E10 | None | SS | 29 |
| E28 | E10 | None | PC | 26 |
| E29 | E16 | E17 | SS | 85 |
| E30 | E16 | E17 | PC | 220 |
| E31 | E16 | None | SS | 65 |
| E32 | E16 | None | PC | 62 |
| E33 | E10 | E18 | SS | 69 |
| CE6 | CE6 | None | SS | 68 |
| CE7 | CE6 | E17 | SS | 53 |

The remaining examples compare combinations of previously described PSA and primer examples. In particular, Example 33 (E33) is composed of E11 PSA and E19 primer solution. Example 34 (E34) is composed of E11 PSA and E20 primer solution. Example 35 is composed of E11 PSA and E21 primer solution. Example 36 is composed of E11 PSA and E22 primer solution. Example 37 is composed of E11 PSA and E23 primer solution. Example 38 is composed of E11 PSA and E24 primer solution.

The adhesive tape for the primer testing was a 50 um E11 material double coated tape (19 um dry E11 adhesive on both sides of a 12 um PET film carrier).

TABLE 5

Combined PSA and Primer compositions in comparison of chemical resistance and peel strength on stainless steel (SS)

| Example | Primer Solution | Pressure Sensitive Adhesive | —COOH (mmol/100 g PU) | Oliec Acid | IPA/H2O | Peel strength on SS After 1 hr RT Dwell [N/dm] |
|---|---|---|---|---|---|---|
| E33 | E19 | E11 | 0.00 | 5 | 5 | 50 |
| E34 | E20 | E11 | 13.05 | 5 | 5 | 67 |
| E35 | E21 | E11 | 22.39 | 5 | 5 | 106 |
| E36 | E22 | E11 | 22.39 | 5 | 5 | 95 |
| E37 | E23 | E11 | 37.44 | 5 | 3 | 101 |
| E38 | E24 | E11 | 52.24 | 5 | 5 | 82 |

What is claimed is:

1. A pressure sensitive adhesive composition comprising a polyurethane polymer that comprises the reaction product of a polyisocyanate component and a polyol component; wherein the polyol component has a total solubility parameter ranging from 10 to 14 $(cal/cm^3)^{1/2}$;
wherein the polyurethane polymer comprises the reaction product of the polyisocyanate component, the polyol component, and a functional acid containing compound;
wherein the functional acid containing compound comprises a plurality of (HX) moieties and one or more (A) moieties, the (HX) moieties being linked to the one or more (A) moieties via an organic linking group; and
wherein the one or more (A) moieties are functional acid groups selected from —$CO_2$M, —$OSO_3$M, —$SO_3$M, —$OPO(OM)_2$, —$PO(OM)_2$, wherein M is H or a cation; X is O, S, NH or NR, wherein R is an alkylene group comprising 1 to 4 carbon atoms; and wherein the organic linking group has a valency of at least 3, comprises 1 to 50 carbon atoms, optionally includes one or more tertiary nitrogen, ether oxygen, or ester oxygen atoms, and is free from isocyanate-reactive hydrogen containing groups.

2. The pressure sensitive adhesive composition of claim 1 wherein the polyol component has hydrogen bonding solubility parameter ranging from 3.5 to 6.

3. The pressure sensitive adhesive composition of claim 1 wherein the polyol component comprises a polyester polyol, a polycaprolactone polyol, a polycarbonate polyol, or a combination thereof.

4. The pressure sensitive adhesive composition of claim 1 wherein the polyol component, isocyanate component, or combination thereof comprises at least one six-membered ring structure.

5. The pressure sensitive adhesive composition of claim 1 wherein the polyol component, isocyanate component, or combination thereof comprises alkylene groups having at least 4 carbon atoms.

6. The pressure sensitive adhesive of claim 1 wherein the polyisocyanate component comprises a polyisocyanate that is a liquid at 25° C.

7. The pressure sensitive adhesive of claim 1 wherein the polyol component comprises repeat units of an ortho- or meta-phthalate, and an alkylene group comprising at least 4 carbon atoms.

8. The pressure sensitive adhesive of claim 1, wherein acid functional groups is —$CO_2$M, X is O or NH, and $R^1$ is an alkylene having from 1 to 7 carbon atoms.

9. The pressure sensitive adhesive of claim 1, wherein the polyurethane comprises between 0.001 and 37 mmol acid functional groups/100 g PU.

10. The pressure sensitive adhesive composition of claim 1 wherein the composition further comprises a chemical crosslinking agent.

11. The pressure sensitive adhesive composition of claim 10, wherein the chemical crosslinking agent comprises an organo-metallic chelating agent or aziridine.

12. A pressure sensitive adhesive composition comprising a polyurethane polymer, wherein the polyurethane polymer comprises the reaction product of a polyisocyanate component comprising a polyisocyanate that is a liquid at 25° C.; and
a polyol component comprising repeat units of an ortho- or meta-phthalate, and an alkylene group comprising at least 4 carbon atoms, wherein the pressure sensitive adhesive has a G' less than 1 MPa at 25° C. and a frequency of 1 hertz.

13. The pressure sensitive adhesive composition of claim 12 wherein polyisocyanate component comprises an aliphatic polyisocyanate, an aromatic polyisocyanate, or a mixture thereof.

14. The pressure sensitive adhesive composition of claim 12 wherein the polyisocyanate component comprises an ortho- or meta-aromatic diisocyanate.

15. The pressure sensitive adhesive composition of claim 12 wherein the polyol component comprises a polymeric polyester polyol having the structure

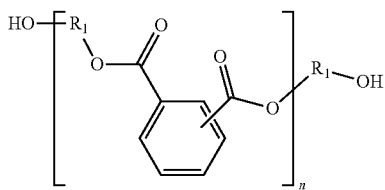

wherein $R_1$ is independently an alkylene group comprising at least 4 carbon atoms, n is at least 2, and
the ester group substituents are bonded to the ring at an ortho- or meta-position.

16. The pressure sensitive adhesive composition of claim 12 wherein the polyol component further comprises a multi-functional polyol having greater than two hydroxyl groups.

17. The pressure sensitive adhesive composition of claim 12 wherein the polyisocyanate component further comprises a multi-functional isocyanate having greater than two isocyanate groups.

18. The pressure sensitive adhesive composition of claim 12 wherein either or both of the multi-functional polyol and multi-functional isocyanate are present in an amount of no greater than 30 mol %.

19. The pressure sensitive adhesive composition of claim 12 wherein the polyurethane has a weight average molecular weight of at least 20,000 g/mole.

20. The pressure sensitive adhesive composition of claim 12 wherein the adhesive has a 180° peel to stainless steel of at least 10N/dm at a peel rate of 300 mm/minute after a 24 hour dwell time at 25° C.

21. The pressure sensitive adhesive composition of claim 12 wherein the adhesive has a 180° peel to stainless steel of at least 10N/dm at a peel rate of 300 mm/minute after a 72 hour dwell time at 65° C. and 90% relative humidity.

22. The pressure sensitive adhesive composition of claim 12 wherein the pressure sensitive adhesive does not dissolve in oleic acid or a 70% isopropyl alcohol aqueous solution after 8 hours at 70° C.

23. The pressure sensitive adhesive composition of claim 12 wherein the pressure sensitive adhesive has a chemical resistance rating of at least 3 for oleic acid and a 70% isopropyl alcohol aqueous solution after 8 hours at 70° C.

24. A laminating tape comprising
a substrate; and
a layer of a pressure sensitive adhesive composition according to claim 12 disposed on a major surface of the substrate.

* * * * *